(12) United States Patent
Bittmann

(10) Patent No.: US 10,037,361 B2
(45) Date of Patent: Jul. 31, 2018

(54) FREQUENT ITEM-SET MINING BASED ON ITEM ABSENCE

(71) Applicant: SAP SE, Walldorf (DE)

(72) Inventor: Ran Bittmann, Tel Aviv (IL)

(73) Assignee: SAP SE, Walldorf (DE)

( * ) Notice: Subject to any disclaimer, the term of this patent is extended or adjusted under 35 U.S.C. 154(b) by 451 days.

(21) Appl. No.: 14/793,405

(22) Filed: Jul. 7, 2015

(65) Prior Publication Data
US 2017/0011096 A1    Jan. 12, 2017

(51) Int. Cl.
*G06F 17/30* (2006.01)

(52) U.S. Cl.
CPC .. *G06F 17/30539* (2013.01); *G06F 17/30522* (2013.01)

(58) Field of Classification Search
CPC ......... G06F 17/30867; G06F 17/30716; G06F 17/30864; G06F 17/30539; G06F 17/30522; G06F 2216/03; G06F 17/2765; G06F 17/30572; H04L 65/403; G06N 5/025
USPC .................................................. 707/706, 776
See application file for complete search history.

(56) References Cited

U.S. PATENT DOCUMENTS

| | | | |
|---|---|---|---|
| 6,278,998 B1 * | 8/2001 | Ozden | G06F 17/30539 |
| 7,370,033 B1 * | 5/2008 | Roychowdhury | |
| | | | G06F 17/30592 |
| | | | 707/602 |
| 7,769,762 B2 | 8/2010 | Lemcke et al. | |
| 8,954,468 B2 | 2/2015 | Yoshida | |
| 2002/0152201 A1 * | 10/2002 | Nanavati | G06F 17/30539 |
| 2003/0217055 A1 * | 11/2003 | Lee | G06F 17/30539 |
| 2005/0071352 A1 * | 3/2005 | Lee | G06F 17/30539 |
| 2008/0147688 A1 * | 6/2008 | Beekmann | G06F 17/18 |
| 2008/0168019 A1 * | 7/2008 | Dakka | G06F 17/3071 |
| | | | 706/48 |
| 2010/0332430 A1 | 12/2010 | Caraviello et al. | |
| 2011/0282815 A1 * | 11/2011 | Thomas | G06N 5/025 |
| | | | 706/12 |
| 2012/0096031 A1 | 4/2012 | Yoshida | |
| 2012/0254242 A1 | 10/2012 | Kanagasabapathi et al. | |
| 2013/0204909 A1 | 8/2013 | Lemcke et al. | |
| 2016/0381580 A1 * | 12/2016 | Kwan | H04W 24/08 |
| | | | 370/252 |

* cited by examiner

*Primary Examiner* — Evan Aspinwall

(74) *Attorney, Agent, or Firm* — Brake Hughes Bellermann LLP

(57) ABSTRACT

A dataset of a plurality of transactions is received, the plurality of transactions including at least a first item and a second item. An absence-based association rule correlating an absence of the first item with an inclusion of the second item within the plurality of transactions is calculated.

12 Claims, 4 Drawing Sheets

FREQUENT ITEM-SET MINING BASED ON ITEM ABSENCE

TECHNICAL FIELD

This description relates to data mining.

BACKGROUND

Data mining refers to the technical field of computer analysis of large datasets, in order, for example, to detect patterns, trends, or associations, which may be helpful in determining correlation or causation between events and/or in predicting future events. With related computational techniques, it is possible to process volumes of data, detect a variety of relationships, and/or establish degrees of reliability in a manner that exceeds human capabilities.

However, computational resources are not currently sufficient to fully realize the advantages of data mining and related techniques. For example, available computer processors and memories may not be capable of performing the number of calculations required to analyze a given quantity of data within an available computing time. In some cases, such inability may occur when the desired volume of input data is too large to store or process effectively. In many cases, however, it is the resulting volume of output data (e.g., potential solutions to the problem being analyzed) that is too large, particularly when data mining algorithm(s) being used are exponential in nature. In such cases, even a relatively small quantity of input data may result in a potential solution space that is beyond the abilities of modern computers to compute in an effective manner. Moreover, the resulting output/solution(s) may not provide a result that is most interesting or most useful for the data and purpose being considered.

Frequent item-set mining (FIM) refers to a family of data mining algorithms, sometimes referred to as market basket analysis (MBA) or association rules learning. This family of algorithms provides examples of the types of algorithms referenced above, which are generally intended to discover relations or rules between individual items in large datasets in business analysis, marketing, or other applications.

For example, such algorithms, applied to transaction data collected at a supermarket, can identify association relations or rules among products purchased by customers. Based on the association rules, customer behaviors can be analyzed, e.g., to facilitate product promotions and sales. Some typical FIM algorithms include, for example, the APRIORI algorithm, the ECLAT algorithm, the FP-growth algorithm, and the linear time closed item-set miner (LCM) algorithm.

SUMMARY

According to one general aspect, a computer program product is tangibly embodied on a non-transitory computer-readable storage medium and comprises instructions that, when executed, are configured to cause at least one computing device to receive a dataset of a plurality of transactions each of the plurality of transactions including one or more items and receive a support threshold representing a minimum item set transaction frequency required for inclusion of an item set in constructing association rules. The instructions, when executed, are further configured to receive a reverse support threshold, calculate support values, filter items from the dataset based on the support threshold and reverse support threshold, generate, for an item in the dataset having support higher then the reverse support threshold, a corresponding negated item, and calculate an absence-based association rule associating the negated item and at least one other item of the one or more items.

According to another general aspect, a computer-implemented method for executing instructions stored on a non-transitory computer readable storage medium and executable by at least one processor includes receiving, at the at least one processor, a dataset of a plurality of transactions, the plurality of transactions including at least a first item and a second item, and calculating, at the at least one processor, an absence-based association rule correlating an absence of the first item with an inclusion of the second item within the plurality of transactions.

According to another general aspect, a system includes instructions recorded on a non-transitory computer-readable storage medium, and executable by at least one processor. The system includes a parameter handler configured to receive a dataset of a plurality of transactions, each of the plurality of transactions including one or more items, a support threshold representing a minimum item set transaction frequency required for inclusion of an item set in constructing association rules, and a reverse support threshold that is higher than the support threshold. The system also includes a support value calculator configured to calculate support values for item sets of the one or more items, a threshold evaluator configured to filter items from the dataset based on the support threshold and reverse support threshold, and a negated item generator configured to generate, for an item in the dataset having support higher then the reverse support threshold, a corresponding negated item for inclusion in an absent item transaction subset of the plurality of transactions in which the item does not appear, the negated item representing the absence of the item.

The details of one or more implementations are set forth in the accompanying drawings and the description below. Other features will be apparent from the description and drawings, and from the claims.

DETAILED DESCRIPTION

Figure 1:
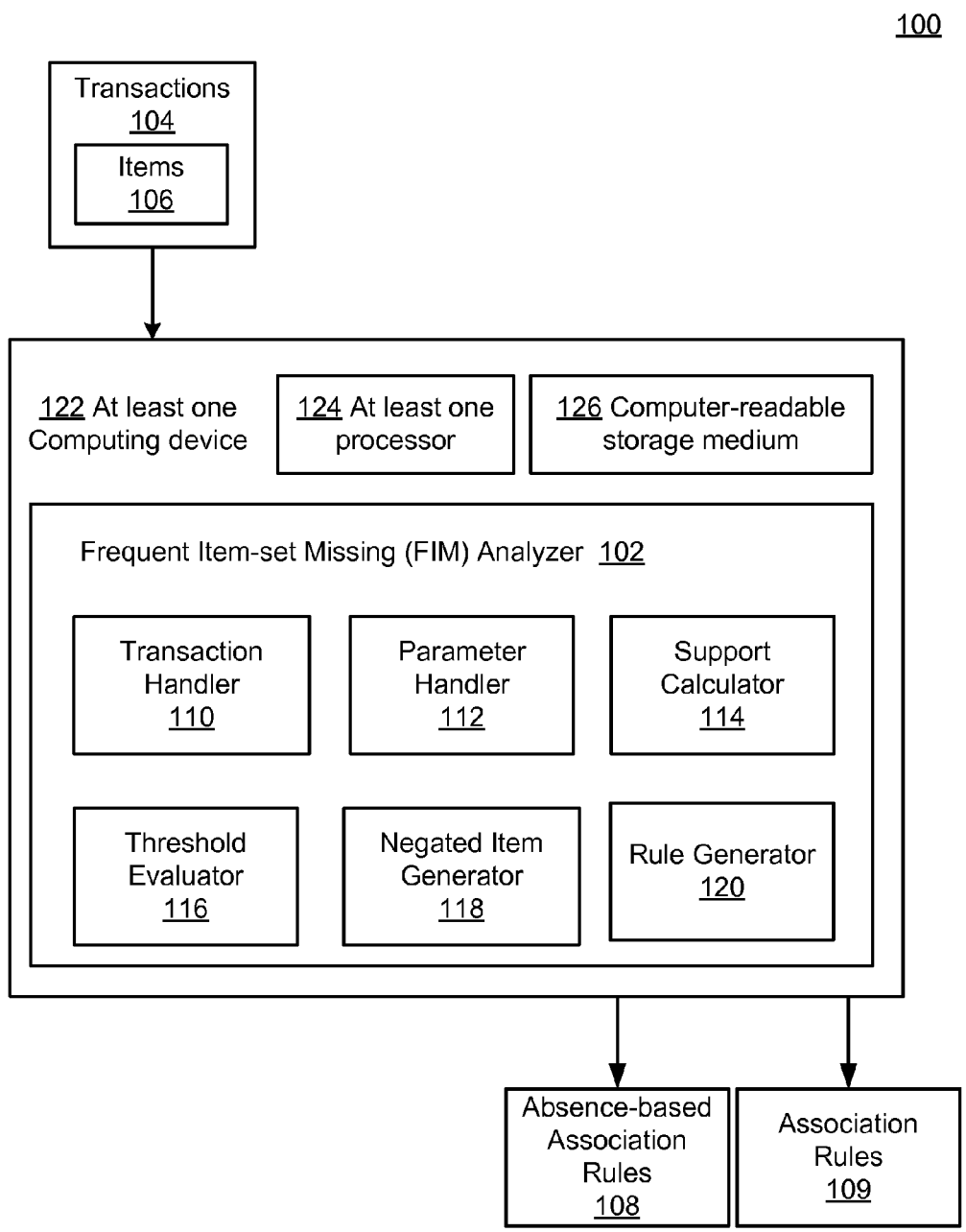
FIG. 1 is a block diagram of a system for frequent item-set mining based on item absence.

FIG. 1 is a block diagram of a system 100 for frequent item-set mining based on item absence. As shown, the system 100 includes a Frequent Item-set Mining (FIM) Analyzer 102 that provides functionality for analyzing a plurality of transactions 104 that include a plurality of items 106, to thereby generate a plurality of absence-based association rules 108 based on an absence of an item(s) of the items 106, as well as association rules 109 based on a presence or inclusion of an item(s) of the items 106. In particular, for example, the absence-based association rules 108 correlate an absence of a particular item (type of item) with a presence or inclusion of another (type of) item, to thereby provide new and highly useful types of association rules as compared to conventional FIM systems. Moreover, the FIM Analyzer 102 of FIG. 1 provides the absence-based association rules 108 in a manner that improves a computational performance of an underlying computing platform (e.g., at least one computing device 122, described in more detail below), including, in various implementations, providing the absence-based association rules 108 and/or the association rules 109 in less time, with fewer computing resources, at less cost, and with fewer non-useful association rules that might otherwise be created and discarded (i.e., would be wasteful of the computing resources).

As referenced, FIM Algorithms can receive the dataset of transactions 104 as input. Each transaction can include a set of items of the total set of items 106. Typical input datasets can include a table with a column for the transaction ID and a column for the item ID (e.g., as shown in Table 1) or a sparse matrix (where space is allocated only for items that exist in a transaction) such as shown in Table 2. The ellipses in Table 2 indicate that a transaction may have additional items and there may be additional transactions.

TABLE 1

| Transaction ID | Item ID |
| --- | --- |
| Transaction-1 | Item 1 |
| Transaction-2 | Item 1 |
| Transaction-3 | Item 2 |
| Transaction-2 | Item 2 |
| Transaction-1 | Item 3 |
| Transaction-1 | Item 2 |
| Transaction-3 | Item 5 |

TABLE 2

| Transaction ID | Item ID | | |
| --- | --- | --- | --- |
| Transaction-1 | Item 1 | Item 2 | Item 3 |
| Transaction-2 | Item 1 | Item 2 | |
| Transaction-3 | Item 2 | Item 5 | |
| ... | | ... | |

In many scenarios, FIM analysis may be performed with respect to items for sale, because a sales transaction tends to include multiple items being purchased, and it is possible to discern association rules 109 with respect to correlations between two or more items. For example, in a simplified example in the context of grocery shopping, a transaction may include the item of "milk" and the item of "eggs," and FIM analysis of a number of such transactions may indicate that purchase of milk is highly correlated with purchase of eggs, so that when a customer purchases milk, a suggestion or incentive is provided to the customer to purchase eggs as well. In a similar example in the context of the system 100 of FIG. 1, and as described in more detail, below, consumers at a fast food restaurant may execute transactions involving, e.g., hamburgers, soda, fries, and salads, and the FIM analyzer 102 of FIG. 1 may create an absence-based association rule 108 indicating that the absence of a hamburger purchase is correlated with the inclusion of a salad purchase. In this way, again, current and future consumers who choose not to purchase a hamburger may receive a suggestion or incentive to purchase a salad.

Since FIM analysis is often performed in the areas of these types of consumer or retail transactions, FIM analysis is sometimes referred to as Market Basket Analysis (MBA), with the idea that each transaction corresponds to a traditional shopping basket used at a market. However, as referenced above, FIM analysis may be performed in many different contexts. Although not possible or desirable to enumerate all such contexts in the present description, it will be appreciated that the techniques described herein may be implemented in all such known or future contexts in which the techniques would be useful. Merely for the sake of non-limiting example, some such contexts may include, e.g., transactions of downloaded files (items include individual files being downloaded), or transactions of web pages viewed (items include individual pages or page portions being viewed). Other examples use cases include intrusion/security detection (either cyber or physical), biological pattern detection (such as in gene analysis), business process analysis (e.g., to determine efficiencies or faults in inventory production or management), or virtually any area of human activity that can be categorized as individual transactions each having one or more items (e.g., voting patterns or health-related choices).

In general, FIM algorithms analyze the transactions being input and, based on a series of input parameters (e.g., the items), suggest and output association rules. In general terminology, and as used herein, an association rule 108, 109 can include two lists of items—a "left-hand side" and a "right-hand side," which essentially represent an input (or input side) and output (or output side), respectively, of the rule. For example, Table 3 shows an example of an association rule 109.

TABLE 3

| Left-hand Side | Right-hand side |
| --- | --- |
| Item 2, Item 5 | Item-1, Item 3 |

Resulting association rules 109 imply that when a set, possibly a new set, of items (sometimes referred to as an "item set" or a "basket") includes the items in the left-hand side of the rule, it is likely that the same item set will contain the items that appear on the right-hand side of the rule. In the example of Table 3, the association rule 109 implies that a set containing item-2 and item-5 is likely to contain item-1 and item-3 as well.

Figure 2:
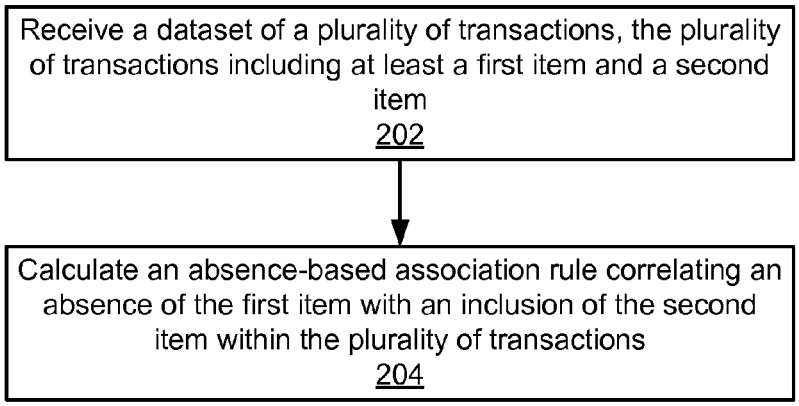
FIG. 2 is a flowchart illustrating example operations of the system of FIG. 1.

In the operations of the FIM Analyzer 102 of FIG. 2, as referenced above, the absence-based association rules 108 may include the types of association rules just referenced with respect to Table 3, but based on an item absence. Thus, the absence-based association rules 108 may rely on the inclusion of a negation, or negated version, of one or more of the items 106 in the transactions 104. As described in detail below, and by way of terminology, such item negations or absences may be included as "NOT items," such as the "NOT hamburger" in the example referenced above and described in more detail below in the illustrative context of fast food transactions. Thus, Table 4 provides an example of an absence-based association rule 108. As shown, the absence-based association rule of Table 4 indicates that purchase of Item 2, together with a failure to purchase Item 5, is associated with purchase of Item 1 and Item 4.

TABLE 4

| Left-hand Side | Right-hand side |
| --- | --- |
| Item 2, NOT Item 5 | Item-1, Item 4 |

In order to arrive at the type of absence-based association rule of Table 4, the FIM Analyzer 102 of FIG. 1 may utilize various conventional techniques related to FIM analysis. Therefore, the present description provides explanation and examples of such techniques and associated terminology, to the extent necessary to understand operations of the system 100 of FIG. 1.

For example, as just referenced, in FIM analysis a normal association rule may include the basket and the sides, where the basket includes all the items that appear in the rule, so that the basket may represent an item set that includes items on both sides of the rule. For example, the basket of the rule in Table 3 contains item 1, item 2, item 3, and item 5. In some implementations, this basket is not necessarily a transaction basket, but instead may be part of multiple transactions baskets. With respect to the sides, each side includes items that appear in the respective side of the rule. The example rule of Table 3 includes item 2 and item 5 on the left-hand side, and item 1 and item 3 on the right-hand side.

Various other parameters used in FIM algorithms for building the absence-based association rules 108 and the association rules 109 are relevant to example operations of the FIM Analyzer 102 of FIG. 1, such as, for example, the parameters of support, support threshold (also referred to as support constraint, or abbreviated as ST), confidence, and confidence threshold (also referred to as confidence constraint, or abbreviated as CT).

The support of a basket refers to a proportion or fraction of transactions in the dataset (e.g., dataset 110) that contain the basket (item or item set). That is, in the simplest case, the item set may include a single item that appears in some defined percentage of transactions of the entire dataset of transactions 104. In other cases, an item set may include two or more items, where each such item set represents a combination of the two or more items. Consequently, for N items, finding all such combinations varies as a function of $2^N$, so that linear increases in included items result in exponential increases in item combinations.

The support constraint or support threshold refers to a minimum number of transactions out of the total number of transactions in which the basket appears, such that the basket is to be considered statistically significant for implementing the FIM algorithm. For example, if there are 10 transactions in a dataset and a support constraint of 0.3 is required for a rule, then the rule's basket (item set) needs to appear in at least 3 transactions to be considered.

Confidence is defined as the support of the basket of a rule divided by the support of the left-hand (or input) side of the rule. In other words, the confidence of the rule, including the confidence of a potential rule or a rule being considered for inclusion/use, is the number of transactions where all the items on both sides of the rule appear out of the number of transactions where the items on the left-hand side of the rule appear. For example, in Tables 1 and 2 above, the support for items 1 and 3 is 33.3% (one transaction includes items 1 and 3), while the support for item 1 is 66.7% (transactions 1 and 2 include item 1). Therefore, the confidence that a rule stating that a transaction having item 1 will also have item 3 is a valid rule would be 50%.

The confidence constraint refers to a minimum threshold of a confidence of a rule such that the rule is to be considered statistically significant for implementing FIM algorithms. For example, if the confidence constraint of the rule in Table 3 is 0.7 and there are 10 transactions containing item-2 and item-5, then at least 7 of them need to contain also item-1 and item-3, i.e., contain item-1, item-2, item-3, and item-5, in order to satisfy the confidence constraint.

The rationale behind the support threshold and confidence threshold is that there needs to be a minimum of transactions of a certain item combination (e.g., item set, or basket) to derive an association rule that can actually provide meaningful information. For example, in order to mine supermarket shopping and record all the transactions in a month, a single transaction containing both dog food and toothpaste does not necessarily imply that it is very likely for one who buys dog food to also buy toothpaste.

FIM algorithms are typically implemented to first find all possible baskets that satisfy the support threshold, and then build the rules that satisfy the confidence threshold. Scanning all the combinations of items in the input dataset can be computationally expensive, especially for large datasets, due to the exponential growth in possible item combinations, as referenced above. In particular, with dense transactions and frequent items, the number of possible baskets to scan demonstrate such exponential growth, so that, in these and related scenarios, many conventional FIM algorithms may not converge or return meaningful results in a sufficient variety of situations.

In some implementations, additional or different parameters may limit the number of items in each side of the rule or the total number of items in a rule. Various other optimizations, such as performing an initial filtering of transactions and/or items to remove undesired or irrelevant input and/or output data also may optionally used. Such techniques are potentially useful with, but not required for, implementation of the techniques described herein, and are therefore not described herein further detail. Nonetheless, it may be observed that virtually all such techniques, and all known techniques related to FIM Analysis in general, may be easily related to operations of the FIM Analyzer 102 of FIG. 1, including operations related to the generation of the absence-based association rules 108.

For example, as described in detail herein, the FIM Analyzer 102 of FIG. 1 may be configured to include a 'reverse support' ("RS") threshold to generate the absence-based association rules 108. The reverse support threshold effectively reverses the existence or inclusion of items with a support higher than a certain threshold (referred to herein as a "reverse support threshold," or "RST"). For example, ten transactions may be considered, in which eight of the transactions include milk. If 80% is higher than the RST (e.g., a RST of 55% or 60%), then such a reversal would result in the remaining two transactions (or 20%) being modified within data storage to include a new item (i.e., a negated item) of NOT milk. In subsequent FIM Analysis, the NOT milk item may be considered as an otherwise normal item; e.g., may be considered with respect to existing support and confidence thresholds. Therefore, if the ST is 0.3, then the NOT milk item would not meet the support level and would be removed. On the other hand, if the ST is 0.15, then the NOT milk item would satisfy the ST and would be retained for future calculations, e.g., related to the confidence threshold and the absence-based association rules 108.

In various implementations, use of the RST effectively results in items with support higher than RST being removed; of the removed items, those with support lower than [1−ST] (where the value [1−ST] is sometimes referred to herein as the "inverse support threshold") will be associated with inclusion within remaining transactions of a new item that is "not the item in question," or NOT item (i.e., note that in the example above with ST=0.15, "milk" has a support of 0.8, which is higher than RST of 0.6 but lower than [1−ST]=0.85, and so a "NOT milk" item is generated for inclusion within the remaining 20% of transactions that did not originally include milk). Items with support lower than the standard support threshold will also be removed.

These and related techniques reduce a complexity and increase the odds of identifying new and interesting association rules (e.g., the absence-based association rules 108), based on the insight that if an item(s) appears in a large percentage of transactions, it might be interesting to relate to that item when it is missing from a transaction.

Thus, in more detail, FIG. 1 illustrates that the FIM analyzer 102 includes a transaction handler 110 that is configured to receive the plurality of transactions 104, including the various items 106. In various implementations, for example, the transaction handler 110 may access and download the transactions 104 from a suitable database or other repository. In other example implementations, the transaction handler 110 may receive the transactions 104 by way of an appropriate user or machine interface. In general, the transactions 104 may be received together, or may be received over time as new data is collected from various reporting sources.

A parameter handler 112 may be configured to receive the various parameters discussed above, and other suitable parameters. For example, again, a suitable graphical user interface (GUI) may be utilized to receive parameters including values for a support threshold, a reverse support threshold, and a confidence threshold. In many implementations, the various parameters may simply be received from the user of the system 100. Additionally, or alternatively, values for the various parameters may be suggested to the user by the parameter handler 112. For example, the parameter handler 112 may be configured to analyze previous iterations or operations of the FIM analyzer 102, in order to suggest optimal parameter values. For example, the parameter handler 112 may implement various machine-learning algorithms to analyze metadata or other characteristics regarding the transactions 104, relative to previously-analyzed transactions, in order to suggest optimal parameter values.

A support calculator 114 may then proceed to calculate support for various items and item sets within the transactions 104. That is, as described above, the support calculator 114 may calculate a relative item frequency of a particular item (or group of items) in a transaction, as compared to a total number of transactions. For example, in the simplest case, a single item may have its support or item frequency calculated by comparing a number of transactions in which that item appears, relative to the total number of the transactions 104. As also described above, similar calculations may be made to obtain support values for groups of two or more items, e.g., a pair of items may have a support value calculated from a number of transactions in which the pair of items appears, relative to the total number of transactions 104.

A threshold evaluator 116 may be configured to receive results of the support calculations executed by the support calculator 114, for comparison against one or more thresholds, including the support threshold and the reverse support threshold. In the examples that follow, for the sake of illustration, a support threshold is assumed to be 0.3, while a reverse support threshold is assumed to be 0.55, and a confidence threshold is set at 0.7. For purposes of evaluating the support threshold of 0.3, the threshold evaluator 116 compares the calculated support for each item or set of items relative to the designated threshold, and filters or removes those items having a support below the threshold.

Similarly, but conversely, the threshold evaluator 118 may evaluate the reverse support threshold by identifying all items or items sets having a frequency or support above the reverse support threshold of 0.55, and then removing all such items or item sets from the set of transactions being considered. For example, in the examples in which the reverse support threshold is equal to 0.55, it may occur that an item has a support value of 0.6, and thus is evaluated by the threshold evaluator 118 as exceeding the reverse support threshold. Consequently, the subset of transactions 104 in which the evaluated item appears may be modified to filter or remove the item in question from that transaction subset.

Then, as referenced above, and described in more detail below, a negated item generator 116 may be configured to consider a transaction subset that is an inverse or converse of the transaction subset from which the just-evaluated item has been removed. For purposes of this description, this inverse or converse subset of transactions is referred to as an "absent item transaction subset." In other words, when the threshold evaluator 116 evaluates an item having a support level higher than the reverse support threshold, the overall set of transactions 104 may be divided into a first transaction subset that includes the item in question, and a second transaction subset, referred to as the absent item transaction subset, that does not include the item in question. Accordingly, a negated item generator 118 may be configured to generate and include a negated item for the item in question, in each of the transactions of the absent item transaction subset.

Thus, in effect, the thus-generated negated item is included in the various transactions of the absent item transaction subset, and may be treated thereafter as any included item might be treated for purposes of generating subsequent association rules. For example, in some implementations, the threshold evaluator 116 may evaluate a count or number of the negated item and the related transactions within the absent item transaction subset, to thereby determine whether the relevant support threshold is met with respect thereto, just as the threshold evaluator 116 is configured to evaluate all items and item sets within the transactions 104 and relative to the relevant support threshold. Of course, it is not necessary to recount a number of transactions within the absent item transaction subset, since the total number of transactions 104 and the count or frequency of the item being negated are both already known.

In practice, it may not be necessary or optimal to generate negated items for inclusion within the absent item transaction subset in scenarios in which the resulting negated items would not have sufficient support to satisfy the support threshold. In other words, as described above, the threshold evaluator 116 may simply be configured to remove items having support levels greater than the reverse support threshold, but to instruct the negated item generator 118 to generate corresponding negated items in scenarios in which the support levels for the item in question fall between the reverse support threshold and the inverse support threshold [1−ST], since only such items would correspond to negated items having sufficient support to satisfy the relevant support threshold.

Subsequently, a rule generator 120 may be configured to receive the various items/item sets including any negated items, and may proceed to apply confidence threshold received by the parameter handler 112 to generate the absent-based association rules 108 and the association rules 109. That is, in various implementations, the rule generator 120 may proceed in an otherwise-standard fashion, but including any negated items generated by the negated item generator 116, if any. In practice, as described in more detail below, the rule generator 120 may be configured to generate only absent-based association rules 108, or association rules 109, or combinations thereof, depending on inputs received by the FIM analyzer 102, e.g., at the parameter handler 112. Of course, all such association rules may be generated together, but are illustrated separately in FIG. 1 for ease of explanation and understanding.

In the example of FIG. 1, the FIM analyzer 102 is illustrated as being executed using at least one computing device 122, which includes at least one processor 124 and a non-transitory computer readable storage medium 126. That is, for example, the at least one computing device 122 may represent two or more computing devices, perhaps communicating over a computer network or other communications interface, such as in a client server relationship. Similarly, the at least one process or 124 may represent two or more processors, perhaps executing in parallel to provide the FIM analyzer 102 in an efficient and convenient manner. The non-transitory computer readable storage medium 126 may represent any suitable storage medium capable of storing instructions for execution by the at least one processor 124, and/or any relevant or required data, such as the transactions 104 and/or the various parameters received by the parameter handler 112.

It will be appreciated from the above description, and from the various examples provided below, that the FIM analyzer 102 operates to improve processing times of the at least one processor 124, and to reduce memory requirements of the computer readable storage medium 126. For example, using the techniques described herein, the FIM analyzer 102 eliminates a number of processing cycles that would otherwise be necessary to consider high frequency items, and thereby improve a time needed, and/or processing or memory reduces resources required, to generate the absence-based association rules 108 and/or the association rules 109.

For example, the FIM analyzer 102 may benefit from the removal of relatively high frequency items, such as in scenarios in which it occurs that items which appear very frequently within the transactions 104 are too frequent to provide insight or value in operations of the rule generator 120. For example, in grocery store scenarios, it may occur that a shopping bag is purchased in 99% of transactions, so that consideration of a shopping bag item by the rule generator 120 would require a significant amount of processing resources and memory resources, without generally returning a high value in terms of corresponding association rules that are ultimately generated. Thus, the FIM analyzer 102 operates to reduce an overall size of an input set of data received at the rule generator 120, while nonetheless including new data in the form of negated items from the negated item generator 116. As a result, association rules output by the rule generator 120 may be selected from an overall solution space that is exponentially smaller than in conventional systems, while still providing the absent-based association rules 108.

Of course, the system 100 of FIG. 1 is intended merely as a simplified illustration of the hardware and software that may be necessary or useful in implementing the FIM analyzer 102. As referenced above, appropriate hardware and software may be included in the system 100, although not explicitly illustrated in the simplified example of FIG. 1, such as a monitor or other appropriate display that may be used to provide a GUI for the FIM analyzer 102 to a user of the system 100, where such details will vary depending on a nature of the underlying computing device(s) 122 (e.g., a server, workstation, desktop, laptop, netbook, notebook, tablet, or smartphone). Many other variations of implementations of the system 100 are described below, or would be apparent.

Figure 3:
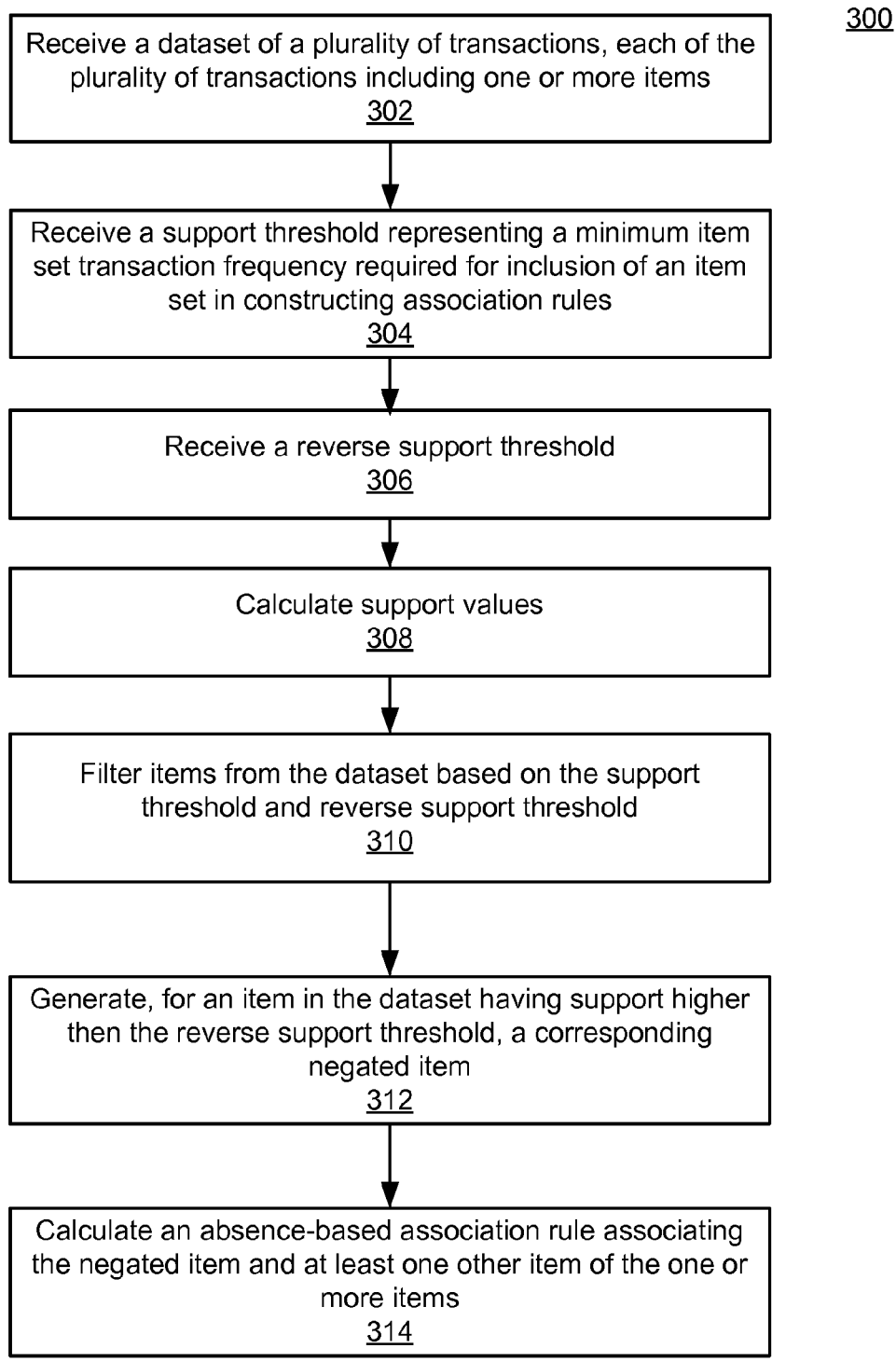
FIG. 3 is a second flowchart, illustrating more detailed example operations related to the system of FIG. 1.

FIGS. 2 and 3 are flowcharts 200 and 300, respectively, illustrating example operations of the system 100 of FIG. 1. In FIG. 2 and FIG. 3, operations are illustrated in separate, sequential order. However, it will be appreciated that additional or alternative operations or sub-operations may be included in various implementations, and/or one or more of the illustrated operations may be omitted. In all such implementations, any two or more of the various operations or sub-operations may be executed in a partially or completely overlapping or parallel manner, or in a nested, iterative, looped, or branched fashion. Similar comments apply to the flowchart 400 of FIG. 4, as well.

In the example of FIG. 2, a dataset of a plurality of transactions may be received, the plurality of transactions including at least a first item and second item (202). For example, the FIM analyzer 102 may receive the transactions 104 including the items 106, as described above.

An absent-based association rule may be generated, correlating an absence of the first item with an inclusion of the second item (204). For example, as also described in detail above, the FIM analyzer 102 may be configured to generate the absence-based association rules 108, correlating a negated item provided by the negated item generator 118 with inclusion of another item of the items 106. For example, in the detailed examples provided below, the FIM analyzer 102 may generate an absence-based association rule correlating an absence of a hamburger in a transaction with an inclusion of a salad.

As referenced above, FIG. 3 is a flowchart 300 illustrating more detailed operations of the system 100 of FIG. 1. In the example of FIG. 3, again, a dataset of a plurality of transactions is received, each of the plurality of transactions including one more items (302). For example, the transaction handler 110 may receive the transactions 104 including the items 106, as described above.

A support threshold representing a minimum item set transaction frequency required for inclusion of an item set in constructing association rules may be received (304). For example, as described, the parameter handler 112 may receive a support threshold parameter characterizing a minimum relative frequency of a given item (e.g., an item set of one item) of the items 106 within a number of transactions of the total number of transactions 104. Of course, as referenced above, relative item transaction frequency or support in this context also may include pairs of items occurring within a single transaction, or other item sets occurring in a subset of the transactions 104.

A reverse support threshold also may be received (306), e.g., by the parameter handler 112. As described herein, the reverse support threshold represents a minimum frequency that is higher than the support threshold parameter, and represents the idea that an item or item set that occurs relatively very frequently may be more interesting to consider in the context of transactions of the transactions 104 that do not include the item or item set in question.

Support values for each specified item and item set may then be calculated (308). For example, the support calculator 114 may calculate the support values as relative item (item set) frequencies as described herein. As also described, the same support value for a given item or item set may be used when evaluating both the support threshold and the reverse support threshold.

More specifically, items may be filtered from the dataset based on the support threshold parameter and the reverse support threshold (310), such as by operation of the threshold evaluator 116 of FIG. 1 in comparing each item and item set to each of the support threshold and the reverse support threshold. In effect, then, the threshold evaluator 116 removes all items and item sets that occur relatively infrequently (i.e., with frequencies below the support threshold), as well as items that occur relatively frequently or very frequently (i.e., above the reverse support threshold).

For an item in the dataset having a frequency higher than the reverse support threshold, a corresponding negated item may be generated (312). For example, the negated item generator 118 may generate a negated item for an item having a frequency higher than the reverse support threshold. More specifically, as described herein, such an item, by definition, occurs within a certain subset of the transactions 104, and, in the relevant examples, the inverse subset of the transactions 104 that does not include the item exceeding the reverse support threshold, referred to herein as the absent item transaction subset, will be modified to include the generated negated item within each transaction thereof.

In some implementations, as referenced above and described in detail below with respect to FIG. 4, such a negated item will only be generated and included within the absent item transaction subset for the item in question in scenarios in which the item in question has a support level falling between the reverse support threshold and the inverse support threshold [1−ST]. This approach reflects scenarios in which increasing item frequency, and the inverse absent item frequency, demonstrate diminishing returns in terms of usefulness in generating the association rules 109 and/or the absence-based association rules 108. For example, as described above, transactions in grocery stores may include purchases of grocery bags in 99% of transactions, and neither the presence nor absence of a grocery bag in a particular transaction may correspond with generation of any type of association rule. In such cases, support for the grocery bag item would exceed the reverse support threshold, but would also fail to reach the [1−ST] inverse support threshold, so that the negated item generator 118 would not generate a "NOT grocery bag" negated item for inclusion within the absent item transaction subset of transactions that do not include the grocery bag (i.e., 1% of the transactions in the example just referenced).

Of course, as also referenced, an analogous approach that would achieve the same result would be to generate a negated item for inclusion within a corresponding absent item transaction subset for each item that exceeds the reverse support threshold, and then to apply the support threshold, using the threshold evaluator 116, to the resulting negated items. It would not be necessary to recount the number of negated items, since the count would simply be equal to the number of transactions in the absent item transaction subset, i.e., the difference between the total number of transactions and the number of transactions that originally included the item in question. In this approach, negated items having a support less than the support threshold would be filtered, thereby arriving at the same result of including negated items in corresponding absent item transaction subsets for corresponding items having support levels between the reverse support threshold RST and the inverse support threshold [1−ST].

It will be appreciated that the decision as to whether to apply the inverse support threshold to the negated items (i.e., to utilize [1−ST] when generating negated items, as opposed to simply including a negated item for all items above the RST) may be made by a user of the system 100, and may depend on a nature of the transactions being analyzed, and/or a nature of desired association rules. For example, although the example above of grocery bags being essentially ubiquitous in the context of grocery store transactions reflects the type of diminishing returns in interest levels for corresponding association rules as described, other scenarios may not demonstrate such effects. For example, in some scenarios, items that appear extremely frequently within a transaction dataset may be of high interest when absent from a small number of the transactions. Somewhat similarly, in various example implementations, it may be desirable to retain items that are above the RST, or between the RST and [1−ST] thresholds, while still adding the negated items to the absent-item transaction subset.

Advantageously in the system 100 of FIG. 1, as described in more detail below with respect to FIG. 4, it is straightforward for a user of the system 100 to modify operations of the FIM analyzer 102 in this and related respects. For example, the FIM analyzer 102 may be executed with various types and combinations of parameters received by the parameter handler 112. Moreover, because the FIM analyzer 102 operates with relatively fewer processing cycles, memory requirements, and other computing resources, the various absent-based association rules 108 and association rules 109 may be obtained quickly and efficiently, so that a human or machine user of the system 100 may effectively experiment with different parameter values and associated uses thereof.

Thus, finally in FIG. 3, an absence-based association rule may be calculated that associates the negated item and at least one other item of the one or more items (314). For example, the rule generator 120 may proceed to calculate one or more of the absence-based association rules 108. As described, in example embodiments, the rule generator 120 may input and consider the negated item as it would input and consider virtually any other item or item set received from the threshold evaluator 116. Accordingly, the rule generator 120 benefits from being able to use a full spectrum of the body of knowledge accumulated with respect to FIM analysis.

Of course, FIG. 3 is a simplified example, and not intended to include all details regarding generation of association rules. For example, as described herein, the parameter handler 112 will also generally receive a confidence threshold for use in generating the absence-based association rules 108 and the association rules 109. Use of the confidence threshold value is referenced above, and described in more detail below, with respect to FIG. 4.

Figure 4:
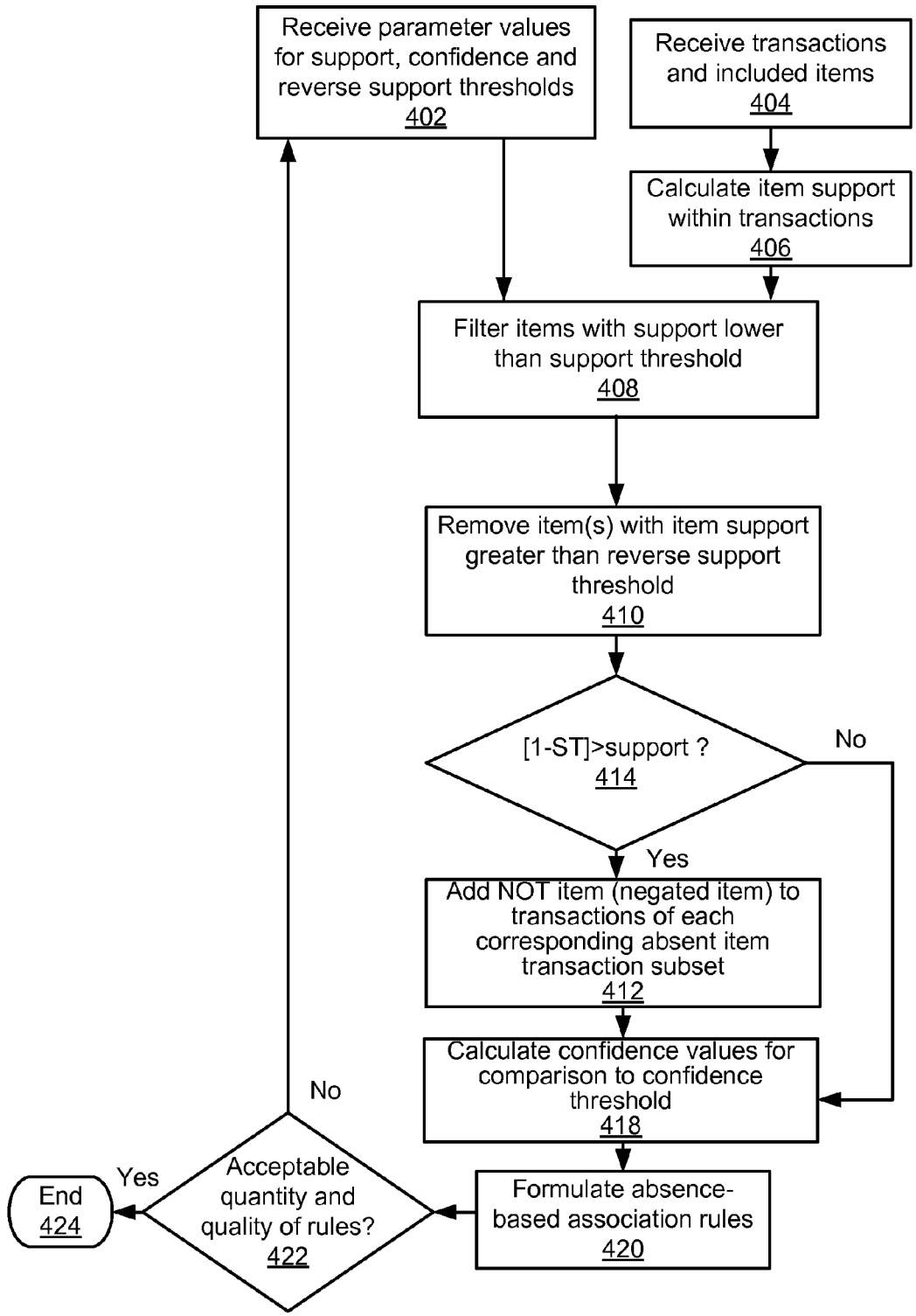
FIG. 4 is a third flowchart, illustrating more detailed example operations related to the system of FIG. 1.

FIG. 4 is a flowchart 400 illustrating additional details regarding example implementations of the system 100 of FIG. 1. In the example of FIG. 4, as already referenced, parameter values for a support threshold, confidence threshold, and reverse support threshold may be received, e.g., by the parameter handler 112.

The transactions 104 and included items 106 may then be received (404) by the transaction handler 110. The support calculator 114 may then calculate item support values within the transactions 104 (406), as described herein.

Thereafter, the threshold evaluator 116 may filter items and item sets having support levels lower than the support threshold (408). Similarly, the threshold evaluator 116 may remove items and item sets having item support levels greater than the reverse support threshold (410).

For each such item having a support level higher than the reverse support threshold, it may be determined whether the specific support level in question is also less than the inverse support threshold [1−ST] (414). If so, then a not item (negated item) will be added to transactions of each corresponding absent item transaction subset (412) by the negated item generator 118.

Once all such negated items have been generated for inclusion in corresponding absent item transaction subsets, various confidence values for each resulting item (and negated item) may be calculated, and compared to the confidence threshold (418) by the rule generator 120. In this way, the rule generator 120 may proceed to formulate association rules, including the absence-based association rules 108 (420).

If an acceptable quantity and quality of rules has been reached (422), then the process of the flowchart 400 may end (424). Otherwise, updated values for the support, confidence, and/or reverse support threshold may be received (402). In other words, as referenced above, it is straightforward for a user of the system 100 to vary, individually or together, the various thresholds, or other related parameters. For example, the user may eliminate generation of the absence-based association rules 108 simply by setting the reverse support threshold to a value of 1.0 or 100%, or simply by omitting inclusion of any reverse support threshold value. Conversely, the user of the system 100 may configure the FIM analyzer 102 to generate only the absence-based association rules 108, without necessarily generating the association rules 109.

In a simplified example in the context of a fast food restaurant, the following transactions may occur as shown in Table 5:

TABLE 5

| Transaction-1 | Coke | Hamburger | Fries |
| Transaction-2 | Coke | Salad | Fries |
| Transaction-3 | Coke | Hamburger | |
| Transaction-4 | Coke | Hamburger | |
| Transaction-5 | Coke | Salad | |

In the example, the support threshold may be 0.3, the confidence threshold may be 0.7, and the reverse support threshold may be 0.55. Then, as may be observed, the item support is: Coke=1.0, Hamburger=0.6, Fries=0.4, and Salad=0.4.

Applying the techniques of FIGS. 2-4, use of the reverse support threshold results in removal of Coke and Hamburger. In this case, the absent item transaction subset would be a null set for Coke, since Coke appears in all transactions, and would be transactions 2 and 5 for Hamburger. Since a generated NOT Coke would have support of 0.0, and would thus be below the support threshold of 0.3 (or, alternatively, would not fall between the RST and [1−ST] thresholds of 0.55 and 0.7), it is not included in further processing.

On the other hand, transactions of the absent item transaction subset for Hamburger (transactions 2 and 5) would each receive a negated item of NOT Hamburger, which would have support of 0.4. That is, the support for Hamburger is 0.55<0.6<0.7, meaning that the negated item NOT Hamburger is retained in the dataset.

Thus, the remaining transactions and included/supported items would be: Transactions 1: Fries; Transaction 2: NOT-Hamburger, Salad, Fries; and Transaction 5: NOT Hamburger, Salad. Applying the confidence threshold of 0.7, the result is: (# of transactions with NOT Hamburger on the left hand side and Salad on the right hand side) divided by (# of transactions with NOT Hamburger on the left hand side)=2/2 or a confidence of 1.0. This results in an absence-based association rule 108 of "NOT hamburger=>Salad."

As may be observed, without the reverse support threshold and related concepts, the transaction dataset of Table 5 would not have generated any association rules. Moreover, the described techniques discovered the interesting phenomenon that people who do not buy a hamburger tend to purchase a salad.

The RST may be used in a programming language implementing the related techniques and FIM algorithm(s), or in a library procedure implementing a related algorithm(s), or in an application programming interface (API) for code implementing a related algorithm(s). Reverse-support may be implemented in the context of a user interface (UI) implementing a related FIM algorithm(s), or in a graphical user interface (GUI). Algorithm output may be implemented to contain a list of items with a support higher than the reverse-support, and, more particularly, may contain a list of items with the frequency those items appear in the input dataset with a support higher than the reverse-support. In such cases, the frequency for the item(s) may be represented as the fraction of the number of transactions out of the total number of transactions, as the absolute number of transactions, as a graphical representation of the number of transactions out of the total number of transactions, or as a graphical representation of the absolute number of transactions.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:
    receive a dataset of a plurality of transactions, each of the plurality of transactions including one or more items;
    receive a support threshold representing a minimum item set transaction frequency required for inclusion of an item set in constructing association rules;
    receive a reverse support threshold;
    calculate support values;
    filter items from the dataset based on the support threshold and reverse support threshold;
    generate, for an item in the dataset having support higher than the reverse support threshold, a corresponding negated item; and
    calculate an absence-based association rule associating the negated item and at least one other item of the one or more items;
    wherein the item has support greater than the reverse support threshold and less than an inverse support threshold defined with respect to the support threshold (ST) as [1−ST], and
    wherein an absent item transaction subset of the plurality of transactions is defined in which the item sets having support higher than the reverse support threshold are not present at receipt of the plurality of transactions, and
    wherein the negated item is generated for inclusion within each transaction of the absent item transaction subset.

2. The computer program product of claim 1, wherein the instructions, when executed, are further configured to:
    remove, from corresponding transactions of the plurality of transactions, item sets having support higher than the reverse support threshold, including the item.

3. The computer program product of claim 1, wherein the instructions, when executed, are further configured to:
    receive a confidence threshold defining a minimum number of transactions in which all items of a potential association rule appear, relative to a number of transactions in which items on an input side of the potential association rule appear; and
    calculate the absence-based association rule using transactions including the negated item, based on the confidence threshold.

4. A computer-implemented method for executing instructions stored on a non-transitory computer readable storage medium and executable by at least one processor, the method comprising:
    receiving, at the at least one processor, a dataset of a plurality of transactions, the plurality of transactions including at least a first item and a second item;
    receiving, at the at least one processor, a support threshold representing a minimum item set transaction frequency;
    receiving, at the at least one processor, a reverse support threshold;
    calculating, at the at least one processor, support for the first item;
    determining, at the at least one processor, that the support for the first item is higher than the support threshold and higher than the reverse support threshold;
    determining that the first item has support greater than the reverse support threshold and less than an inverse support threshold defined with respect to the support threshold (ST) as [1−ST];
    generating a negated first item for inclusion in each transaction of an absent item transaction subset of the plurality of transactions in which the first item does not appear, the negated first item representing the absence of the first item;
    calculating, at the at least one processor, an absence-based association rule correlating the negated first item with an inclusion of the second item within the plurality of transactions.

5. The method of claim 4, comprising:
    removing the first item from a transaction subset of the plurality of transactions in which the first item appears.

6. The method of claim 4, comprising:
    receiving a confidence threshold defining a minimum number of transactions in which all items of a potential association rule appear, relative to a number of transactions in which items on an input side of the potential association rule appear; and
    calculating the absence-based association rule using transactions including the negated first item on the input side, based on the confidence threshold.

7. A system including instructions recorded on a non-transitory computer-readable storage medium, and executable by at least one processor, the system comprising:
    a parameter handler configured to receive
        a dataset of a plurality of transactions, each of the plurality of transactions including one or more items,
        a support threshold representing a minimum item set transaction frequency required for inclusion of an item set in constructing association rules, and a reverse support threshold that is higher than the support threshold;

a support value calculator configured to calculate support values for item sets of the one or more items;

a threshold evaluator configured to filter items from the dataset based on the support threshold and reverse support threshold;

a negated item generator configured to generate, for an item in the dataset having support higher than the reverse support threshold, a corresponding negated item for inclusion in an absent item transaction subset of the plurality of transactions in which the item does not appear, the negated item representing the absence of the item; and a rule generator configured to calculate an absence-based association rule association rule associating the negated item and at least one other item of the one or more items, wherein the threshold evaluator is further configured to determine that the item has support greater than the reverse support threshold and less than an inverse support threshold defined with respect to the support threshold (ST) as [1−ST].

8. The system of claim 7, wherein the threshold evaluator is further configured to remove the negated item from the absent item transaction subset if the negated item has support less than the support threshold.

9. The system of claim 7, wherein the threshold evaluator is further configured to remove the item from a transaction subset of the plurality of transactions in which the first item appears.

10. The system of claim 7, wherein the parameter handler is further configured to receive a confidence threshold defining a minimum number of transactions in which all items of a potential association rule appear, relative to a number of transactions in which items on an input side of the potential association rule appear.

11. The system of claim 10, wherein the rule generator is further configured to calculate the absence-based association rule using transactions including the negated first item on the input side, based on the confidence threshold.

12. The system of claim 7, wherein the rule generator is configured to calculate the absence-based association rule based on a frequent item set mining (FIM) algorithm including one or more of: the APRIORI algorithm, the ECLAT algorithm, the FP-growth algorithm, and the linear time closed item-set miner (LCM) algorithm.

* * * * *